US012492471B2

(12) United States Patent
Battle et al.

(10) Patent No.: US 12,492,471 B2
(45) Date of Patent: Dec. 9, 2025

(54) PRECURSOR DELIVERY SYSTEMS FOR DETERMINING MATERIAL LEVELS (71) Applicant: ENTEGRIS, INC., Billerica, MA (US)

(72) Inventors: Scott L. Battle, Cedar Park, TX (US); Benjamin Cardozo, Burnet, TX (US); Chase Parker, Burnet, TX (US)

(73) Assignee: ENTEGRIS, INC., Billerica, MA (US)

(*) Notice: Subject to any disclaimer, the term of this patent is extended or adjusted under 35 U.S.C. 154(b) by 552 days.

(21) Appl. No.: 17/959,792

(22) Filed: Oct. 4, 2022

(65) Prior Publication Data

US 2023/0113646 A1 Apr. 13, 2023

Related U.S. Application Data (60) Provisional application No. 63/252,316, filed on Oct. 5, 2021.

(51) Int. Cl.
*C23C 16/455* (2006.01)
*G01G 17/04* (2006.01)

(52) U.S. Cl.
CPC .......... *C23C 16/455* (2013.01); *G01G 17/04* (2013.01)

(58) Field of Classification Search
None
See application file for complete search history.

(56) References Cited

U.S. PATENT DOCUMENTS

| | | | | |
|---|---|---|---|---|
| 6,443,435 | B1* | 9/2002 | Hendrickson | H01J 37/3244 261/DIG. 65 |
| 6,837,251 | B1* | 1/2005 | Zorich | B08B 9/032 141/105 |
| 8,097,213 | B2* | 1/2012 | Vierheilig | B01J 8/0015 422/111 |
| 10,175,093 | B2* | 1/2019 | Gungor | G01P 15/09 |
| 10,480,070 | B2* | 11/2019 | Birtcher | C23C 16/4481 |
| 11,166,441 | B2* | 11/2021 | Birtcher | B65D 51/24 |
| 11,834,740 | B2* | 12/2023 | Marquardt | C23C 16/4481 |
| 2005/0028841 | A1* | 2/2005 | Zorich | B08B 9/00 134/26 |
| 2013/0220221 | A1* | 8/2013 | Sanchez | C23C 16/455 118/712 |
| 2018/0023195 | A1* | 1/2018 | Muneshwar | C23C 16/52 118/724 |
| 2020/0016558 | A1* | 1/2020 | Birtcher | B65D 7/04 |

FOREIGN PATENT DOCUMENTS

| | | |
|---|---|---|
| WO | 200940536 A | 4/2009 |
| WO | 202180783 A | 4/2021 |
| WO | 2021118317 A1 | 6/2021 |

* cited by examiner

*Primary Examiner* — Jethro M. Pence (57) ABSTRACT

A precursor delivery system for determining material levels and related methods can include an ampoule and at least one tray disposed in the ampoule. The at least one tray may be configured to hold an amount of a precursor material. A load cell assembly is also included. The load cell assembly may include a load cell. The load cell assembly may be coupled to the at least one tray in a configuration sufficient for the at least one tray to exert a mechanical force upon the load cell. This mechanical force may be correlative to the amount of precursor material present on the at least one tray and thus may be used to determine material levels within the ampoule.

11 Claims, 7 Drawing Sheets

PRECURSOR DELIVERY SYSTEMS FOR DETERMINING MATERIAL LEVELS

PRIORITY

This disclosure claims priority to U.S. Provisional Patent Application No. 63/252,316 with a filing date of Oct. 5, 2021. The priority document is incorporated herein for all purposes.

FIELD

This disclosure generally relates to precursor delivery systems.

BACKGROUND

Semiconductor processing tools utilize vapor precursors. Devices for supplying vapor precursors produce the vapor precursor by vaporizing solid or liquid precursor materials. The process for producing vapor precursors involves exposure of the internal components of these devices to harsh conditions and corrosive materials.

SUMMARY

Some embodiments relate to a precursor delivery system. In some embodiments, the precursor delivery system may include an ampoule and at least one tray disposed in the ampoule. In some embodiments, the at least one tray may be configured to hold an amount of a precursor material. In some embodiments, a load cell is included. In some embodiments, the load cell may form part of a load cell assembly. In some embodiments, the load cell is coupled to the at least one tray in a configuration sufficient for the at least one tray to exert a mechanical force upon the load cell. In some embodiments, the mechanical force is correlative to the amount of precursor material present on the at least one tray and is used to determine material levels within the ampoule.

In some embodiments, the load cell is configured to measure a tensile force.

In some embodiments, the load cell is configured to measure a compressive force.

In some embodiments, the load cell is disposed in the ampoule.

In some embodiments, the load cell is disposed in the ampoule in a sealed enclosure.

In some embodiments, the load cell may include a corrosion resistant coating.

In some embodiments, the load cell is disposed outside the ampoule.

In some embodiments, the load cell is disposed in a recessed cavity formed in the ampoule.

Some embodiments relate to a precursor delivery system. In some embodiments, the precursor delivery system may include an ampoule and at least one tray disposed in the ampoule. In some embodiments, the at least one tray is configured to hold an amount of a precursor material. In some embodiments, a load cell assembly is included. In some embodiments, the load cell assembly may comprise a load cell and a support member. In some embodiments, the support member may couple the at least one tray to the load cell in a configuration sufficient for the at least one tray to exert a mechanical force upon the load cell. In some embodiments, the mechanical force is correlative to an amount of precursor material present on the at least one tray.

In some embodiments, the at least one tray is attached to the support member.

In some embodiments, the support member includes a tube member and a base plate.

In some embodiments, a proximal end of the tube member is coupled to the load cell and a distal end of the tube member is coupled to the base plate.

In some embodiments, the at least one tray is disposed on the base plate.

In some embodiments, the support member includes a tube member defining a passageway for a carrier gas.

In some embodiments, the tube member is coupled to the at least one tray.

In some embodiments, the at least one tray is movable with respect to the ampoule.

In some embodiments, the at least one tray is not movable with respect to the support member.

In some embodiments, the load cell is mounted above the at least one tray to an interior surface of the ampoule.

In some embodiments, the load cell is disposed above the at least one tray on an exterior surface of the ampoule.

In some embodiments, the load cell is disposed in a recessed cavity formed in an exterior surface of the ampoule.

Some embodiments relate to a precursor delivery system. In some embodiments, the precursor delivery system may include an ampoule, a load cell disposed in the ampoule, and at least one tray disposed on the load cell. In some embodiments, the at least one tray is disposed on the load cell in a configuration sufficient for the at least one tray to exert a mechanical force upon the load cell. In some embodiments, the mechanical force is correlative to an amount of material present on the at least one tray.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
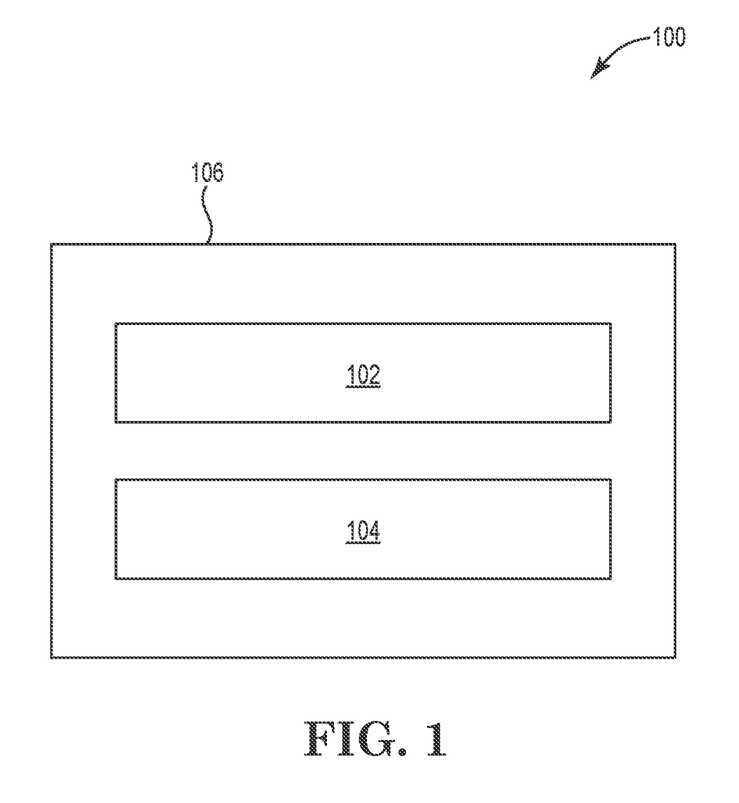
FIG. 1 is a schematic diagram of a precursor delivery system, according to some embodiments.

FIG. 1 is a schematic diagram of a precursor delivery system 100, according to some embodiments. The precursor delivery system 100 is useful for determining precursor material levels according to any of the embodiments disclosed herein in any combination. At least some of the embodiments of the precursor delivery system 100 are used in deposition processes. Deposition processes may include, for example and without limitation, at least one of a chemical vapor deposition (CVD) process, an atomic layer deposition (ALD) process, a plasma-enhanced atomic layer deposition (PEALD) process, a metal organic chemical vapor deposition (MOCVD) process, a plasma-enhanced chemical vapor deposition (PECVD) process, or any combination thereof. The precursor materials may include any source precursor material, including vaporizable precursor materials. Vaporizable precursor materials may be provided as vaporizable solid precursor materials, vaporizable liquid precursor materials, or any combination thereof.

As used herein, the term "load cell" refers to any type of sensor useful for measuring force. The term includes, for example and without limitation, force sensors, force transducers, and the like. The dimensions, shape, and capacity, among other specifications, of the load cells are not particularly limited. For example, the load cell may be dimensioned, shaped, and selected to meet any specification, application, and/or use. In some embodiments, the load cell is useful for measuring a mechanical force exerted by at least one tray. The mechanical force(s) may include, for example and without limitation, at least one of a load, a weight, a tensile force, a compressive force, or any combination thereof. That is, the load cells may be configured to measure one type of mechanical force or any combination of mechanical forces. For example, in some embodiments, a load cell for measuring compressive forces is used herein. In some embodiments, a load cell for measuring tensile forces is used herein. In some embodiments, a load cell configured to measure both tensile forces and compressive forces is used herein. Non-limiting examples of load cells include, without limitation, at least one of pneumatic load cells, hydraulic load cells, strain-gauge load cells, capacitance load cells, threaded load cells; through-hole load cells (e.g., donut load cells); in-line load cells; pancake load cells; column load cells (e.g., canister load cells); s-beam load cells; load button load cells; single point load cells; multi axis load cells; or any combination thereof.

In some embodiments, the precursor delivery system 100 includes a load cell 102 coupled to one or more trays 104. The load cell 102 is configured to measure at least one of a load, a weight, a tensile force, a compressive force, or any combination thereof. The one or more trays 104 is configured to hold an amount of a precursor material. In some embodiments, the load cell 102 is coupled to the one or more trays 104 in a configuration sufficient to result in the one or more trays 104 exerting a mechanical force upon the load cell 102. To measure the amount of precursor material on the one or more trays 104, the load cell 102 may be configured to measure the mechanical force exerted by the one or more trays 104 upon the load cell 102. This mechanical force may be correlative to the amount of precursor material on the one or more trays 104. Accordingly, the mechanical force may be used to measure or determine the amount of precursor material on the one or more trays 104. For example, as the precursor material is consumed (e.g., vaporized), during operation of the precursor delivery system 100, the mechanical force upon the load cell 102 decreases and this decrease is correlative to the amount of precursor material on the one or more trays 104.

In some embodiments, the precursor delivery system 100 further includes an ampoule 106 defining an interior volume. The ampoule 106 may contain at least one of the load cell 102, the one or more trays 104, the precursor material, or any combination thereof, in the interior volume. The ampoule 106 includes an outlet port (not shown) to provide precursor vapor. In some embodiments, the one or more trays 104 and the precursor material are disposed in the interior volume. In some embodiments, the load cell 102 is disposed in the interior volume. For example, in some embodiments, the load cell 102 is disposed in a lower portion of the interior volume (e.g., disposed on a surface, below at least one of the one or more trays 104). In some embodiments, the load cell 102 is disposed in an upper portion of the interior volume (e.g., mounted to an interior surface of the ampoule 106, above the one or more trays 104). In some embodiments, the load cell 102 is disposed external to the interior volume of the ampoule 106. For example, in some embodiments, the load cell 102 is disposed on an external surface of the ampoule 106 (e.g., above the one or more trays 104). In some embodiments, the load cell 102 is disposed in a recessed cavity formed in the ampoule 106 (e.g., an exterior surface of the ampoule 106). It will be appreciated that other configurations may be employed herein without departing from this disclosure.

The precursor delivery system 100 may be configured to allow fluid flow (e.g., gas flow) through and/or within the ampoule 106. In some embodiments, the ampoule 106 and, optionally the one or more trays 104, may include, define, or include and define one or more passageways for flowing a fluid. For example, the ampoule 106 may be configured to allow fluid flow from the bottom of the interior volume to the top of the interior volume, from the top of the interior volume to the bottom of the interior volume, or any combination thereof. In some embodiments, the ampoule 106 is provided in a vapor draw configuration. In vapor draw configurations, the fluid may include the vaporized precursor material. In some embodiments, the ampoule 106 is provided in a carrier gas configuration. In carrier gas configurations, the fluid may include a carrier gas and the vaporized precursor material. In some embodiments, fluid from the precursor delivery system 100 is delivered to a semiconductor processing tool, among other downstream operations.

As mentioned above, the precursor materials may include any source precursor material, including vaporizable precursor materials. In some embodiments, the precursor material comprises, consists of, or consists essentially of, or is selected from the group consisting of, at least one of dimethyl hydrazine, trimethyl aluminum (TMA), hafnium chloride (HfCl$_4$), zirconium chloride (ZrCl$_4$), indium trichloride, indium monochloride, aluminum trichloride, titanium iodide, tungsten carbonyl, Ba(DPM)$_2$, bis dipivaloyl methanato strontium (Sr(DPM)$_2$), TiO(DPM)$_2$, tetra dipivaloyl methanato zirconium (Zr(DPM)$_4$), decaborane, octadecaborane, boron, magnesium, gallium, indium, antimony, copper, phosphorous, arsenic, lithium, sodium tetrafluoroborates, precursors incorporating alkyl-amidinate ligands, organometallic precursors, zirconium tertiary butoxide (Zr(t-OBu)$_4$), tetrakisdiethylaminozirconium (Zr(Net$_2$)$_4$), tetrakisdiethylaminohafnium (Hf(Net$_2$)$_4$), tetrakis(dimethylamino)titanium (TDMAT), tertbutyliminotris(diethylamino)tantalum (TB TDET), pentakis(dimethylamino)tantalum (PDMAT), pentakis(ethylmethylamino)tantalum (PEMAT), tetrakisdimethylaminozirconium (Zr(NMe$_2$)$_4$), hafniumtertiarybutoxide (Hf(tOBu)$_4$), xenon difluoride (XeF$_2$), xenon tetrafluoride (XeF$_4$), xenon hexafluoride (XeF$_6$), or any combination thereof.

In some embodiments, the precursor material comprises, consists of, or consists essentially of, or is selected from the group consisting of, at least one of decaborane, hafnium tetrachloride, zirconium tetrachloride, indium trichloride, metalorganic β-diketonate complexes, tungsten hexafluoride, cyclopentadienylcycloheptatrienyl-titanium (CpTiCht), aluminum trichloride, titanium iodide, cyclooctatetraenecyclo-pentadienyltitanium, biscyclopentadienyltitaniumdiazide, trimethyl gallium, trimethyl indium, aluminum alkyls like trimethylaluminum, triethylaluminum, trimethylamine alane, dimethyl zinc, tetramethyl tin, trimethyl antimony, diethyl cadmium, tungsten carbony, or any combination thereof.

In some embodiments, the precursor material comprises, consists of, or consists essentially of, or is selected from the group consisting of, at least one of elemental metal, metal halides, metal oxyhalides, metalorganic complexes, or any combination thereof. For example, in some embodiments, the precursor material comprises, consists of, or consists essentially of, or is selected from the group consisting of, at least one of elemental boron, copper, phosphorus, decaborane, gallium halides, indium halides, antimony halides, arsenic halides, gallium halides, aluminum iodide, titanium iodide, $MoO_2Cl_2$, $MoOCl_4$, $MoCl_5$, $WCl_5$, $WOCl_4$, $WCl_6$, cyclopentadienylcycloheptatrienyltitanium (CpTiCht), cyclooctatetraenecyclopenta-dienyltitanium, biscyclopentadienyltitanium-diazide, $In(CH_3)_2(hfac)$, dibromomethyl stibine, tungsten carbonyl, metalorganic β-diketonate complexes, metalorganic alkoxide complexes, metalorganic carboxylate complexes, metalorganic aryl complexes, metalorganic amido complexes, or any combination thereof.

In some embodiments, the precursor material comprises, consists of, or consists essentially of, or is selected from the group consisting of, at least one of any type of source material that can be liquefied either by heating or solubilization in a solvent including, for example and without limitation, at least one of decaborane, $(B_{10}H_{14})$, pentaborane $(B_5H_9)$, octadecaborane $(B_{18}H_{22})$, boric acid $(H_3BO_3)$, $SbCl_3$, $SbCl_5$, or any combination thereof. In some embodiments, the precursor material comprises, consists of, or consists essentially of, or is selected from the group consisting of, at least one of at least one of $AsCl_3$, $AsBr_3$, $AsF_3$, $AsF_5$, $AsH_3$, $As_4O_6$, $As_2Se_3$m $As_2S_2$, $As_2S_3$, $As_2S_5$, $As_2Te_3$, $B_4H_{11}$, $B_4H_{10}$, $B_3H_6N_3$, $BBr_3$, $BCl_3$, $BF_3$, $BF_3.O(C_2H_5)_2$, $BF_3.HOCH_3$, $B_2H_6$, $F_2$, $HF$, $GeBr_4$, $GeCl_4$, $GeF_4$, $GeH_4$, $H_2$, $HCl$, $H_2Se$, $H_2Te$, $H_2S$, $WF_6$, $SiH_4$, $SiH_2Cl_2$, $SiHCl_3$, $SiCl_4$, $SiH_3Cl$, $NH_3$, $NH_3$, $Ar$, $Br_2$, $HBr$, $BrF_5$, $CO_2$, $CO$, $COCl_2$, $COF_2$, $Cl_2$, $ClF_3$, $CF_4$, $C_2F_6$, $C_3F_8$, $C_4F_8$, $C_5F_8$, $CHF_3$, $CH_2F_2$, $CH_3F$, $CH_4$, $SiH_6$, $He$, $HCN$, $Kr$, $Ne$, $Ni(CO)_4$, $HNO_3$, $NO$, $N_2$, $NO_2$, $NF_3$, $N_{20}$, $C_8H_{24}O_4Si_4$, $PH_3$, $POCl_3$, $PCl_5$, $PF_3$, $PFS$, $SbH_3$, $SO_2$, $SF_6$, $SF_4$, $Si(OC_2H_5)_4$, $C_4H_{16}Si_4O_4$, $Si(CH_3)_4$, $SiH(CH_3)_3$, $TiCl_4$, $Xe$, $SiF_4$, $WOF_4$, $TaBr_5$, $TaCl_5$, $TaF_5$, $Sb(C_2H_5)_3$, $Sb(CH_3)_3$, $In(CH_3)_3$, $PBr_5$, $PBr_3$, $RuF_5$, or any combination thereof.

In some embodiments, the solvent(s) is an organic solvent, an inorganic solvent, or any combination hereof. In some embodiments, the solvent(s) contains forms of arsenic, phosphorus, antimony, germanium, indium, tin, selenium, tellurium, fluorine, carbon, boron, aluminum, bromine, carbon, chlorine, nitrogen, silicon, tungsten, tantalum, ruthenium, selenium, nickel, sulfur, or any combination thereof. It will be appreciated that other precursor materials may be used herein without departing from this disclosure.

Figure 2:
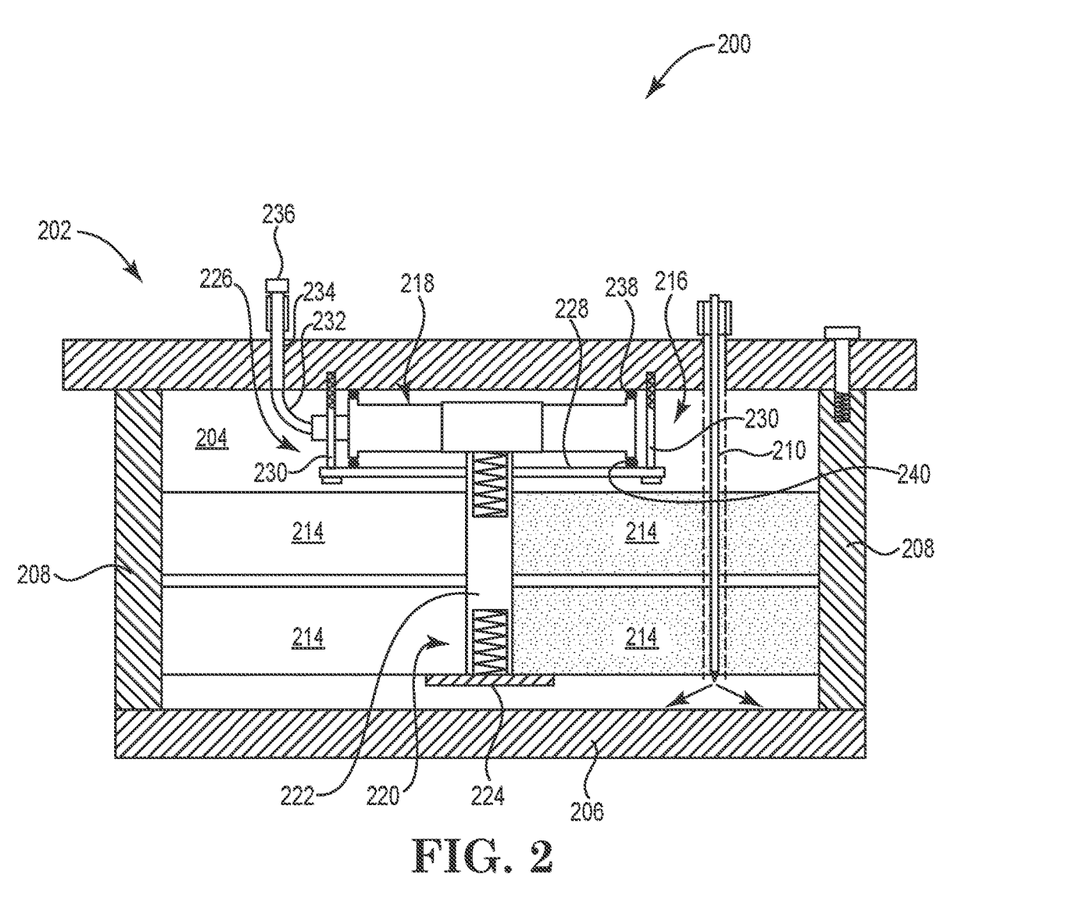
FIG. 2 is a schematic cross-sectional view of a precursor delivery system useful for determining material levels based on tensile forces, according to some embodiments.

FIG. 2 is a schematic cross-sectional view of a precursor delivery system 200, according to some embodiments. The precursor delivery system 200 may be useful for measuring or determining material levels based on tensile forces.

As shown in FIG. 2, the precursor delivery system 200 includes an ampoule 202. The ampoule 202 defines an interior volume 204 and includes an ampoule base 206, an ampoule sidewall 208 circumscribing the ampoule base 206, and an ampoule lid 212 enclosing the interior volume 204.

The interior volume 204 is dimensioned for holding one or more trays 214. The one or more trays 214 is configured to hold an amount of a precursor material. In some embodiments, a conduit 210 is included. The conduit 210 may be useful for introducing a fluid (e.g., a carrier gas) into the interior volume 204. In the illustrated embodiments, the ampoule 202 is a single ampoule body and generally cylindrical in shape. In other embodiments, the ampoule 202 may have a multiple-ampoule body and/or may have any other ampoule shape and thus, in some of these other embodiments, the ampoule 202 may have more than one sidewall. In addition, the ampoule may be of unitary construction or may be an assembly of components.

The ampoule 202 includes, in an upper portion of the interior volume 204, a load cell assembly 216. The load cell assembly 216 includes a load cell 218. The load cell 218 is configured to measure the amount of the precursor material present or remaining on the one or more trays 214. To measure the amount of the precursor material, the one or more trays 214 is coupled to the load cell 218 in a configuration sufficient for the one or more trays 214 to apply or exert a mechanical force upon the load cell 218. In the illustrated embodiment, the load cell 218 is configured to measure at least a tensile force exerted by the one or more trays 214. The tensile force is correlative to the amount of precursor material present or remaining on the one or more trays 214. In some embodiments, the load cell 218 is configured to convert the input tensile force from the one or more trays 214 into an output signal. The output signal may be received by a processor. The processor may be configured to process, and optionally monitor, the output signal to determine the amount of the precursor material on the one or more trays 214. In other embodiments, the load cell 218 is also configured to process the output signal.

In some embodiments, the load cell assembly 216 includes a support member 220. The support member 220 may be configured to couple the load cell 218 to the one or more trays 214. In some embodiments, the support member 220 includes a tube member 222 and a base plate 224. The tube member 222 may be a generally rigid member. In some embodiments, for example, the tube member 222 is a generally inelastic member. The length of the tube member 222 may be sufficient to extend at least partially below at least one of the one or more trays 214. In some embodiments, for example, the tube member 222 extends below the one or more trays 214 sufficient for the base plate 224 to extend beneath and optionally support the bottom-most tray. The tube member 222 has a proximal end and a distal end. The proximal end is coupled to the load cell 218. The distal end is coupled to the base plate 224. In this way, the tube member 222 and the base plate 224 may couple the load cell 218 to the one or more trays 214. In the illustrated embodiment, the load cell 218 includes male threads for coupling with the female threads at the proximal end of the tube member 222 and the base plate 224 includes male threads for coupling with the female threads at the distal end of the tube member 222. It will be appreciated that other attachment mechanisms and other types of supports members may be used herein without departing from the scope of this disclosure.

In some embodiments, the base plate 224 is dimensioned and shaped sufficient to support the one or more trays 214. For example, the base plate 224 may be a planar member that extends beneath, in direct or indirect contact with, at least a portion of a bottom surface of at least one tray. In this way, the one or more trays 214 may be disposed within the ampoule 202 with some freedom of motion. That is, the one or more trays 214 may be movable within and/or movable relative to the ampoule 202 or any component thereof. This freedom of motion permits the tensile force upon the load cell 218 to vary with the amount of precursor material present on the one or more trays 214. In other words, the base plate 224 should be weight bearing with respect to the one or more trays 214. For example, in some embodiments, the base plate 224 is configured to suspend the one or more trays 214 from the load cell 218. That is, the one or more trays 214 may be resting on the base plate 224. If a stack of trays is present, each tray in the stack may rest on each other, or optionally on a spacer between trays, and the stack of trays including the spacer(s) may rest on the base plate 224. In other embodiments, one or more trays 214 may be attached (e.g., welded, fastened, etc.) to at least one of the tube member 222, the base plate 224, or any combination thereof. In some embodiments, the one or more trays 214 is not movable with respect to the support member 220.

In some embodiments, the load cell assembly 216 includes a sealed enclosure 226. The sealed enclosure 226 may be useful for protecting the load cell 218 from the corrosive environment and harsh conditions present within the ampoule 202 during, for example, operation of the precursor delivery system 200. The sealed enclosure 226 includes a mounting plate 228 and a sidewall 230. The mounting plate 228 is mounted to the inner surface of the ampoule lid 212. The load cell 218 is contained within the sealed enclosure 226, between the inner surface of the ampoule lid 212 and the mounting plate 228. Mechanical fasteners may be used for attaching the mounting plate 228 to the ampoule lid 212. Examples of mechanical fasteners include, without limitation, screws, nuts and bolts, clasps, and the like. It will be appreciated that other types of mechanical fasteners may, as well as attachment mechanisms other than mechanical fasteners, may be used herein without departing from this disclosure. For example, in some embodiments, the mounting plate 228 and/or the load cell 218 is welded to the ampoule lid 212. In some embodiments, the sealed enclosure 226 is not included. For example, in some embodiments, the sidewall 230 is not included.

In some embodiments, the sealed enclosure 226 includes one or more holes dimensioned and shaped for passage of various components. For example, as shown, the sealed enclosure 226 includes at least one hole in at least one of the sidewalls 230 and at least one hole in the mounting plate 228. Wire leads 232 extending from the load cell 218 may pass through the hole in the sidewall. The tube member 222 may pass through the hole in the mounting plate 228. The ampoule lid 212 may further be adapted to permit passage of the wire leads 232 for connection to a power source, among other things. For example, in some embodiments, the wire leads 232 may pass through a conduit 234 formed in the ampoule lid 212. The wire leads 232 may extend external to the ampoule lid 212. In some embodiments, a hermetically sealed connection 236 is fitted to the end of the wire leads 232.

In some embodiments, the load cell assembly 216 includes sealing members 238, 240. The sealing members 238, 240 may be useful for limiting movement of the load cell 218, for example, within the sealed enclosure 226. The sealing members 238, 240 may be useful for load cells which do not require freedom of movement to sense forces. For example, the sealing members 238, 240 may be useful for load cells including one or more internal diaphragm elements. The internal diaphragm element(s) may be configured to flex in response to a mechanical force sufficient to permit measurement of the force upon the load cell 218. For example, in the load cell 218, the internal diaphragm elements may be configured to undergo tension, compression, or any combination thereof in response to the mechanical force exerted by the one or more trays 214. In the illustrated embodiment, the sealing member 238 is disposed between the load cell 218 and the ampoule lid 212, and the sealing member 240 is disposed between the load cell 218 and the mounting plate 228. In other embodiments, the load cell 218 may be allowed to move within the sealed enclosure 226 and/or mounting plate 228. For example, in some embodiments, a load cell 218, without an internal diaphragm element or other similar element, may require some freedom of movement within the sealed enclosure 226.

It will be appreciated that other configurations and attachment mechanisms may be used herein without departing from this disclosure. In some embodiments, for example, a body of the load cell 218 is attached to the ampoule 202 without the mounting plate 228 and/or without the sealed enclosure 226. In some embodiments, the sealed enclosure 226 is attached to the ampoule sidewall 208. In some embodiments, the sealed enclosure 226 is attached to the ampoule sidewall 208 and the ampoule lid 212. In some embodiments, the precursor delivery system 200 does not comprise the sealed enclosure 226. For example, in some of these embodiments, the load cell 218 includes a coating. The coating may be disposed on exposed surfaces of the load cell 218 to protect the load cell 218 from the corrosive environment and harsh conditions present within the ampoule 202. Accordingly, in some embodiments, the coating includes a corrosion resistant material. In other embodiments, the coating may comprise or may further comprise at least one of an inert material, a non-reactive material, a corrosion resistant material, or any combination thereof. In an embodiment, the coating is ceramic (e.g., $Al_2O_3$) or polymeric (e.g., PTFE). In some embodiments, the trays 214 are coated with the coating. The trays 214 may be stainless steel, graphite, or other materials known to those of skill in the art.

Figure 3:
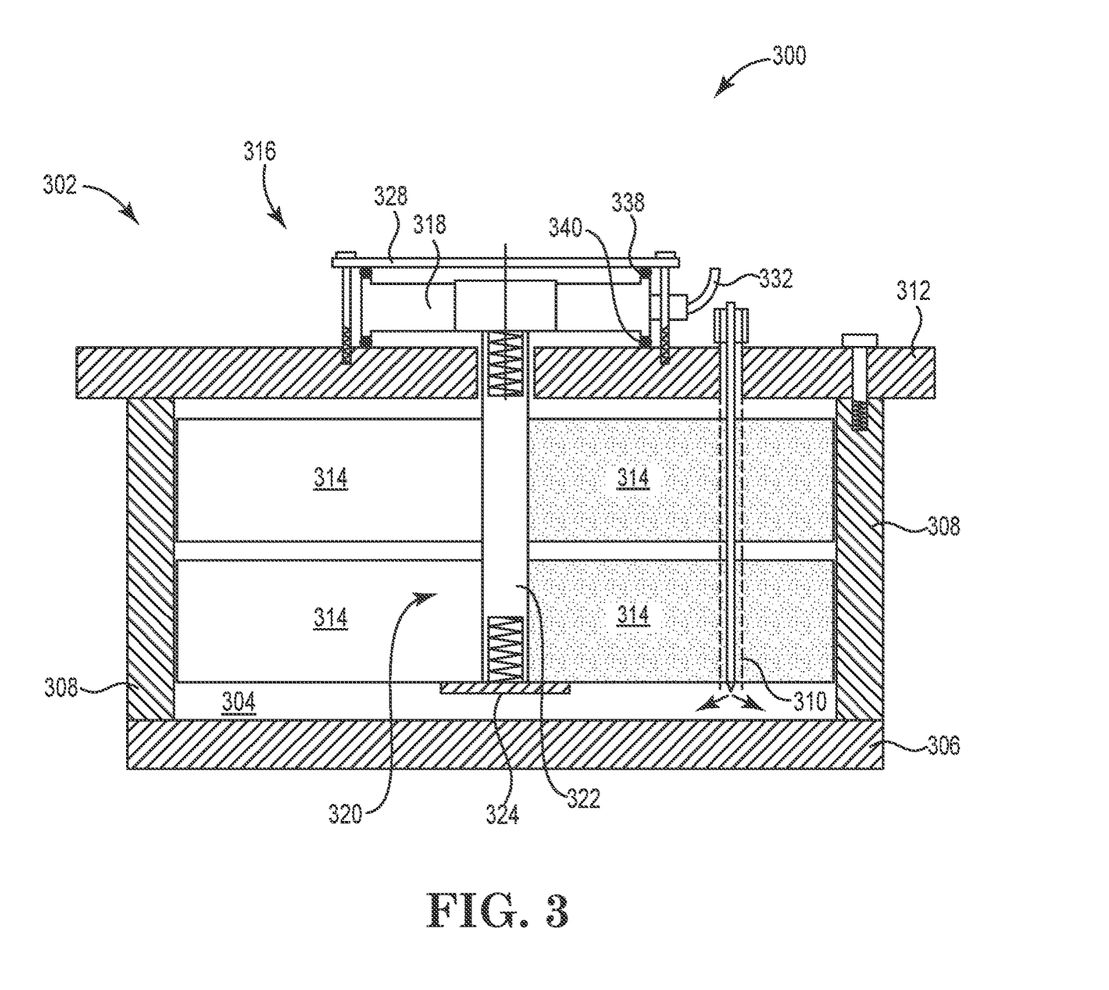
FIG. 3 is a schematic cross-sectional view of a precursor delivery system useful for determining material levels based on tensile forces, according to some embodiments.

FIG. 3 is a schematic cross-sectional view of a precursor delivery system 300, according to some embodiments. The precursor delivery system 300 may be useful for measuring or determining material levels based on tensile forces. The precursor delivery system 300 is same or similar to the precursor delivery system 200. Accordingly similar reference numbers are used. Some of the differences between the precursor delivery systems 200 and 300 are discussed. However, it will be appreciated that other differences may exist without departing from the scope of this disclosure.

As shown in FIG. 3, the precursor delivery system 300 includes an ampoule 302 and a load cell assembly 316. The ampoule 302 defines an interior volume 304. The ampoule 302 includes an ampoule lid 312 enclosing the interior volume 304 and one or more trays 314 disposed in the interior volume 304. The load cell assembly 316 includes a load cell 318 for measuring at least a tensile force, a mounting plate 328, and a support member 320 which includes a tube member 322 and a base plate 324. In the illustrated embodiment, the load cell 318 is external to the interior volume 304, disposed between the mounting plate 328 and the ampoule lid 312. The tube member 322 couples the base plate 324 to the load cell 318. With the load cell 318 being located outside the ampoule 302, a hole is formed in the ampoule lid 312 for the tube member 322. The tube member 322 extends from the load cell 318 through the hole into the interior volume 304 of the ampoule 302. At least one advantage of this arrangement and configuration is that the load cell is not exposed to the corrosive environment and/or harsh conditions involved in vaporization of precursor materials. In some embodiments, this may obviate the need for a sealed enclosure, a corrosion resistant coating, or any combination thereof.

In some embodiments, features not discussed with respect to FIG. 3 are same or similar to the features discussed with respect to FIG. 2.

Figure 4:
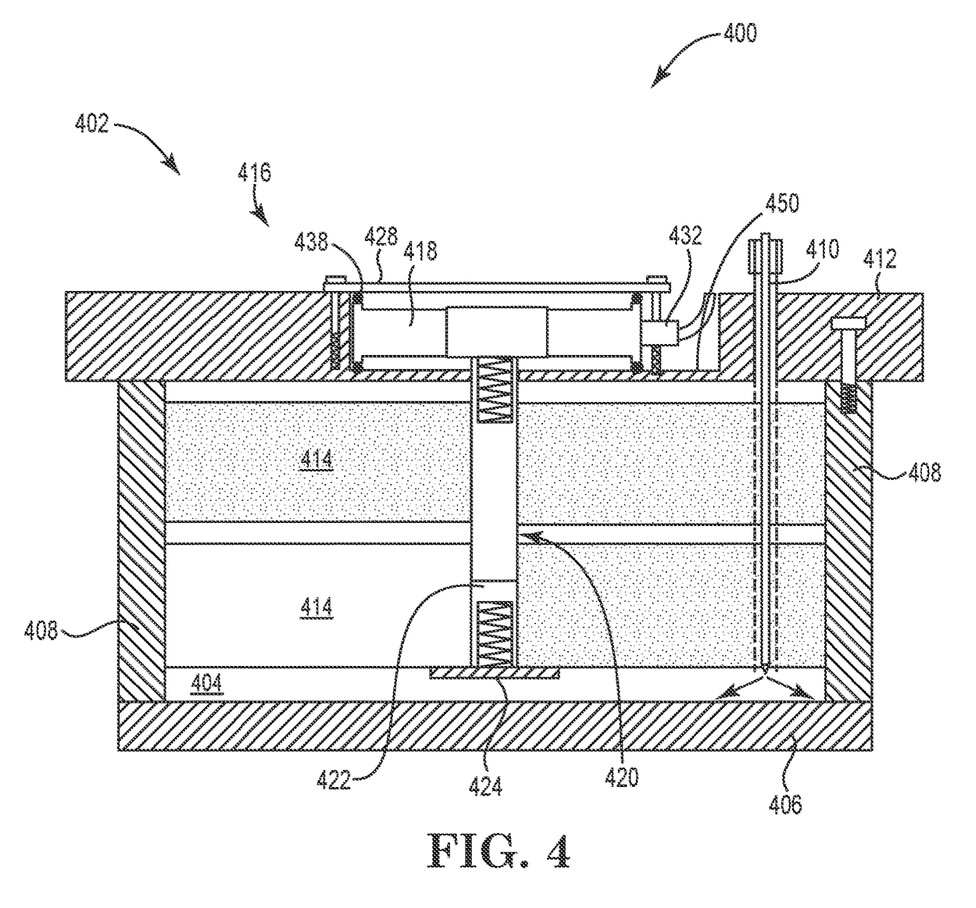
FIG. 4 is a schematic cross-sectional view of a precursor delivery system useful for determining material levels based on tensile forces, according to some embodiments.

FIG. 4 is a schematic cross-sectional view of a precursor delivery system 400, according to some embodiments. The precursor delivery system 400 may be useful for measuring or determining material levels based on tensile forces. The precursor delivery system 400 is same or similar to the precursor delivery systems 200, 300. Accordingly similar reference numbers are used. Some of the differences between the precursor delivery systems 200, 300, 400 are discussed. However, it will be appreciated that other differences may exist without departing from the scope of this disclosure.

As shown in FIG. 4, the precursor delivery system 400 includes an ampoule 402 and a load cell assembly 416. The ampoule 402 defines an interior volume 404. The ampoule 402 includes an ampoule lid 412 enclosing the interior volume 404 and one or more trays 414 disposed in the interior volume 404. The ampoule lid 412 includes a recessed cavity 450 formed in a surface thereof. The recessed cavity may be dimensioned and/or shaped sufficient to hold at least a portion of the load cell 418. The load cell assembly 416 includes a load cell 418 for measuring at least a tensile force, a mounting plate 428, and a support member 420 which includes a tube member 422 and a base plate 424. In the illustrated embodiment, the load cell 418 is disposed in the recessed cavity 450, between the mounting plate 428 and the ampoule lid 412. The tube member 422 couples the base plate 424 to the load cell 418. With the load cell 418 being located outside the ampoule 402, a hole is formed in the ampoule lid 412 for the tube member 422. The tube member 422 extends from the load cell 418 through the hole into the interior volume 404 of the ampoule 402. This arrangement and configuration may have similar advantages to the precursor delivery systems 200, 300, and may also obviate the need for a sealed enclosure, a corrosion resistant coating, or any combination thereof.

In some embodiments, features not discussed with respect to FIG. 4 are same or similar to the features discussed with respect to FIG. 2 and/or FIG. 3.

Figure 5:
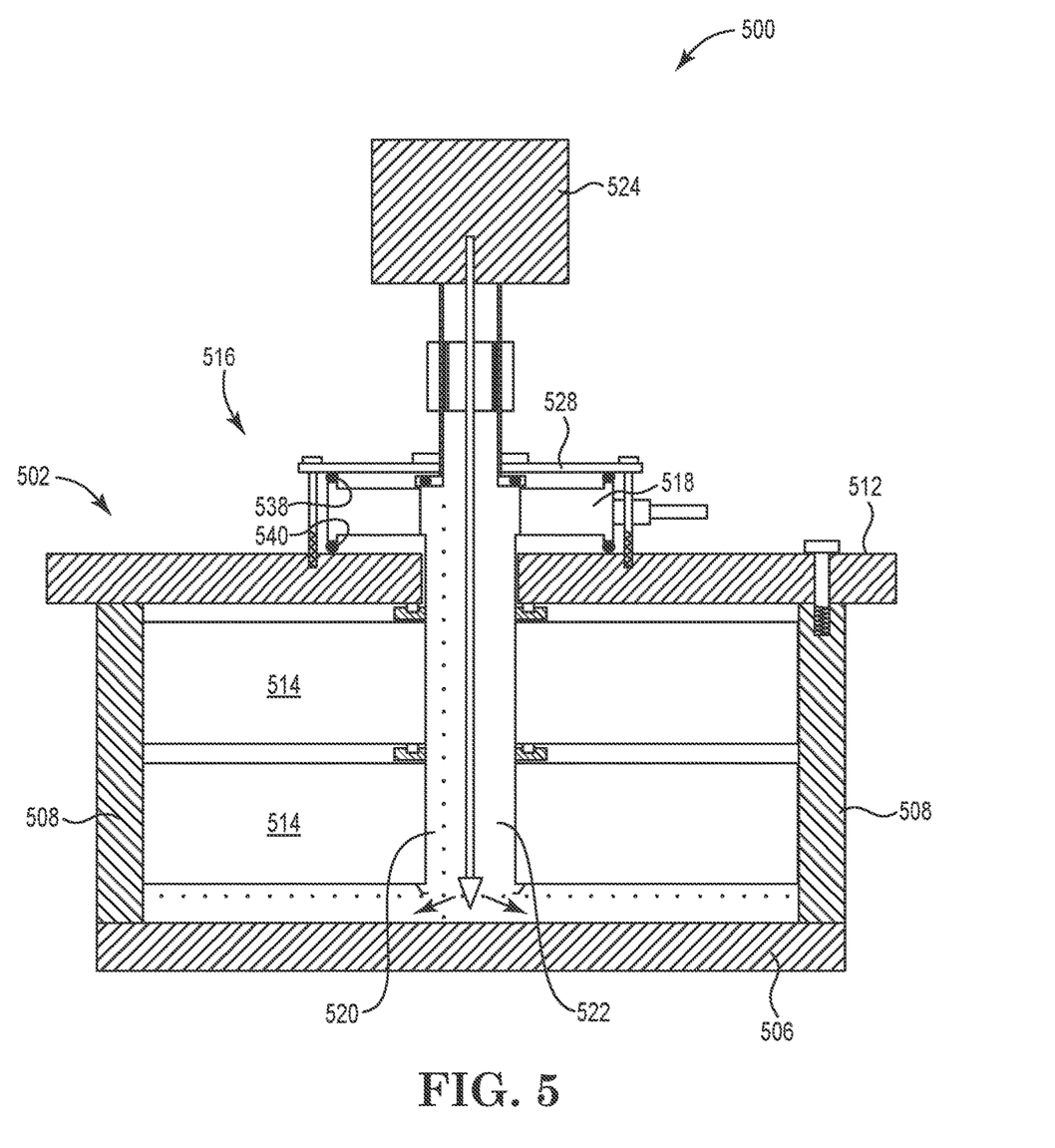
FIG. 5 is a schematic cross-sectional view of a precursor delivery system useful for determining material levels based on compressive forces, according to some embodiments.

FIG. 5 is a schematic cross-sectional view of a precursor delivery system 500, according to some embodiments. The precursor delivery system 500 may be useful for measuring or determining material levels based on compression forces.

As shown in FIG. 5, the precursor delivery system 500 includes an ampoule 502 defining an interior volume 504. The ampoule 502 includes an ampoule base 506, an ampoule sidewall 508 circumscribing the ampoule base 510, and an ampoule lid 512 enclosing the interior volume 504. The interior volume 504 is dimensioned for holding one or more trays 514. The one or more trays 514 is configured to hold an amount of a precursor material. In the illustrated embodiments, the ampoule 502 is a single ampoule body and generally cylindrical in shape. In other embodiments, the ampoule 502 may have a multiple-ampoule body and/or may have any other ampoule shape and thus, in some of these other embodiments, the ampoule 502 may have more than one sidewall. In addition, the ampoule may be of unitary construction or may be an assembly of components.

The precursor delivery system 500 includes a load cell assembly 516. The load cell assembly 516 includes a load cell 518, external to the interior volume, disposed between a mounting plate 528 and the ampoule lid 512. In some embodiments, the load cell 518 is a through-hole load cell (e.g., a donut load cell). The load cell 518 is configured to measure the amount of the precursor material present or remaining on the one or more trays 514. To measure the amount of the precursor material, the one or more trays 514 is coupled to the load cell 518 in a configuration sufficient for the one or more trays 514 to apply or exert a mechanical force upon the load cell 518. In the illustrated embodiment, the load cell 518 is configured to measure at least a compressive force exerted by the one or more trays 514. The compressive force is correlative to the amount of precursor material present or remaining on the one or more trays 514. In some embodiments, the load cell 518 is configured to convert the input compressive force from the one or more trays 514 into an output signal. The output signal may be received by a processor. The processor may be configured to process, and optionally monitor, the output signal to determine the amount of the precursor material on the one or more trays 514. In other embodiments, the load cell 518 is also configured to process the output signal.

In some embodiments, the load cell assembly 516 includes a support member 520. The support member 520 may be configured to couple the load cell 518 to the one or more trays 514. In some embodiments, the support member 520 includes a tube member 522. The tube member 522 may be a generally rigid member. In some embodiments, for example, the tube member 522 is a generally inelastic member. The tube member 522 may couple the load cell 518 to the one or more trays 514 and, in some embodiments, may define a passageway for fluid flow (e.g., carrier gas flow). In the illustrated embodiment, the tube member 522 has a proximal end coupled to a valve 524 and a distal end that opens into the interior volume 504 of the ampoule 502. The length of the tube member 522 may be sufficient to extend at least partially below at least one of the one or more trays 514. In embodiments in which the load cell 518 is a through-hole load cell, the tube member 522 may extend through the through-hole of the load cell 518, a hole formed in the mounting plate 528, and a hole formed in the ampoule lid 512 into the interior volume 504. It will be appreciated that other attachment mechanisms and other types of supports members may be used herein without departing from the scope of this disclosure.

In some embodiments, the tube member 522 is configured to be attached to the one or more trays 514. The mechanism for attaching or coupling the one or more trays 514 to the tube member 522 is not particularly limited. Any type of mechanical fastener or other type of attachment mechanism may be used herein. In some embodiments, the one or more trays 514 may be coupled to the tube member 522, but otherwise the one or more trays 514 may be disposed within the ampoule 502 with some freedom of motion. That is, the one or more trays 514 may be movable within and/or movable relative to the ampoule 502 and/or the ampoule sidewall 508. This freedom of motion permits the compression force upon the load cell 518 to vary with the amount of precursor material present on the one or more trays 514. In other words, the tube member 522 and/or the load cell 518 should be weight bearing with respect to the one or more trays 514. For example, in some embodiments, the one or more trays 514 is not attached to the ampoule 502 or the ampoule sidewall 508, such that the one or more trays 514 is suspended from the tube member 522. In some embodiments, the one or more trays 514 is not movable with respect to the support member 520.

In some embodiments, the load cell assembly 516 includes sealing members 538, 540. The sealing members 538, 540 may be useful for limiting movement of the load cell 518, for example, between the mounting plate 528 and the ampoule lid 512. The sealing members 538, 540 may be useful for load cells which do not require freedom of movement to sense forces. For example, the sealing members 538, 540 may be useful for load cells including one or more internal diaphragm elements. The internal diaphragm element(s) may be configured to flex in response to a mechanical force sufficient to permit measurement of the force upon the load cell 518. For example, in the load cell 518, the internal diaphragm elements may be configured to undergo tension, compression, or any combination thereof in response to the mechanical force exerted by the one or more trays 514. In the illustrated embodiment, the sealing member 538 is disposed between the load cell 518 and the ampoule lid 512, and the sealing member 540 is disposed between the load cell 518 and the mounting plate 528. In other embodiments, the load cell 518 may be allowed to move within between the mounting plate 528 and the ampoule lid 512. For example, in some embodiments, a load cell 518, without an internal diaphragm element or other similar element, may require some freedom of movement between the mounting plate 528 and the ampoule lid 512.

Figure 6:
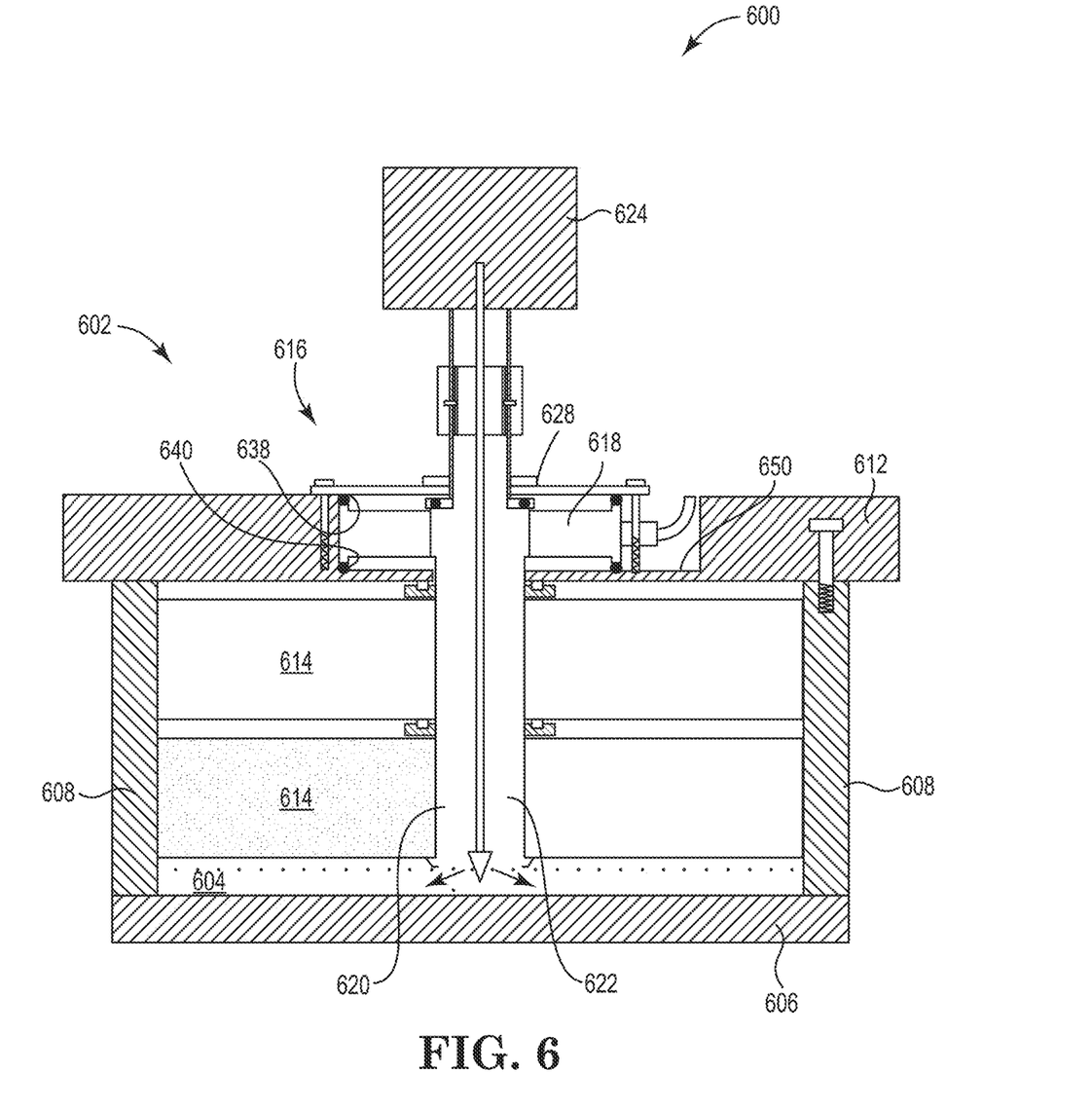
FIG. 6 is a schematic cross-sectional view of a precursor delivery system useful for determining material levels based on compressive forces, according to some embodiments.

FIG. 6 is a schematic cross-sectional view of a precursor delivery system 600, according to some embodiments. The precursor delivery system 600 may be useful for measuring or determining material levels based on compression forces. The precursor delivery system 600 is same or similar to the precursor delivery system 500. Accordingly similar reference numbers are used. Some of the differences between the precursor delivery systems 500 and 600 are discussed. However, it will be appreciated that other differences may exist without departing from the scope of this disclosure.

As shown in FIG. 6, the precursor delivery system 600 includes an ampoule 602 and a load cell assembly 616. The ampoule 602 defines an interior volume 604. The ampoule 602 includes an ampoule lid 612 enclosing the interior volume 604 and one or more trays 614 disposed in the interior volume 604. The ampoule lid 612 includes a recessed cavity 650 formed in a surface thereof. The recessed cavity may be dimensioned and/or shaped sufficient to hold or contain at least a portion of the load cell 618. The load cell assembly 616 includes a load cell 618 for measuring at least a compressive force, a mounting plate 628, and a support member 620 which includes a tube member 622. In the illustrated embodiment, the load cell 618 is disposed in the recessed cavity 650, between the mounting plate 628 and the ampoule lid 612. The tube member 622 couples the load cell 618 to the one or more trays 614. With the load cell 618 being located outside the ampoule 602, a hole is formed in the ampoule lid 612 for the tube member 622. The tube member 622 extends from the valve 624 through the through-hole of the load cell 618 and through the hole formed in the ampoule lid 612 into the interior volume 604 of the ampoule 602.

In some embodiments, features not discussed with respect to FIG. 6 are same or similar to the features discussed with respect to FIG. 5.

Figure 7:
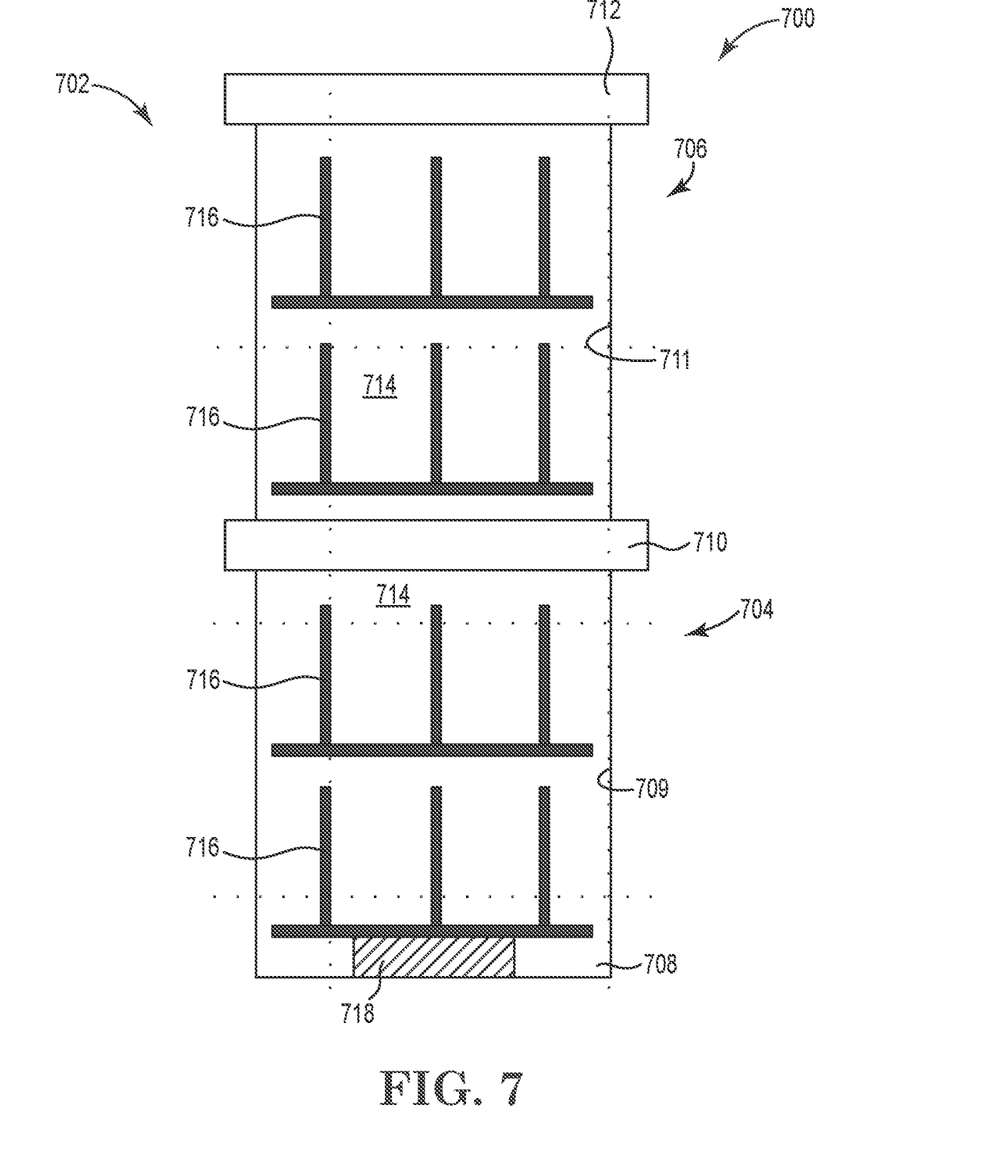
FIG. 7 is a schematic cross-sectional view of a precursor delivery system useful for determining material levels based on compressive forces, according to some embodiments.

FIG. 7 is a schematic cross-sectional view of a precursor delivery system 700, according to some embodiments. As shown, the precursor delivery system 700 is based on a vapor draw configuration. In the vapor draw configuration, the precursor delivery system 700 may include, but does not require, passageways for carrier gas flow. In other embodiments, the precursor delivery system 700 is based on a carrier gas configuration. In the carrier gas configuration, the precursor delivery system 700 includes passageways for carrier gas flow. The passageways may be formed in (or defined by) trays, the configuration and arrangement of the trays within the precursor delivery system 700, or any combination thereof.

The precursor delivery system 700 includes a multiple-ampoule body 702. The multiple-ampoule body 702 includes a first ampoule 704 and a second ampoule 706. The first ampoule 704 may include an ampoule base 708 and an ampoule sidewall 709 circumscribing the ampoule base 708. The ampoule base 708 may form a bottom surface of the multiple-ampoule body 702. The first ampoule 704 and the second ampoule 706 may be connected by a rim opening 710. The second ampoule 706 may include an ampoule sidewall 711, and an ampoule lid 712. The ampoule lid 712 may enclose an interior volume 714 of the multiple-ampoule body 702. The interior volume 714 may extend along at least a portion of the length of the first ampoule 704 and the second ampoule 706. In other embodiments, the precursor delivery system 700 may be a single-ampoule body. For example, the precursor delivery system 700 may include only one ampoule, such as one of the first ampoule 704 or the second ampoule 706.

The multiple-ampoule body 702 is dimensioned sufficient to hold one or more trays 716 and a load cell 718. The one or more trays 716 is configured to hold an amount of a precursor material. The one or more trays 716 may be disposed on the load cell 718. For example, the one or more trays 716 may disposed on the load cell 718 in a configuration sufficient for measuring an amount of material present on the one or more trays 716. In some embodiments, the one or more trays 716 may disposed on the load cell 718 in a configuration sufficient for the at least one tray to exert a mechanical force upon the load cell 718. In some embodiments, the load cell 718 is weight bearing or in a weight bearing configuration with respect to the one or more trays 716. In some embodiments, the one or more trays 716 is disposed directly on a surface of the load cell 718. In other embodiments, the one or more trays 716 is not disposed directly on the surface of the load cell 718. In some of these other embodiments, the surface coupled to the load cell 718 is weight bearing with respect to the one or more trays 716.

The terminology used herein is intended to describe embodiments and is not intended to be limiting. The terms "a," "an," and "the" include the plural forms as well, unless clearly indicated otherwise. The terms "comprises" and/or "comprising," when used herein, specify the presence of the stated features, integers, steps, operations, elements, and/or components, but do not preclude the presence or addition of one or more other features, integers, steps, operations, elements, and/or components.

It is to be understood that changes may be made to the construction of materials employed, as well as the shape, the size, and the arrangement of parts without departing from the scope of the present disclosure. The discussion and embodiments herein are provided as examples, with the scope and spirit of this disclosure being indicated by the claims that follow.

What is claimed is:
1. A precursor delivery system comprising:
an ampoule;
at least one tray disposed in the ampoule; and
a load cell assembly comprising:
a load cell, and
a support member, wherein the support member couples the at least one tray to the load cell in a configuration sufficient for the at least one tray to exert a mechanical force upon the load cell, wherein the mechanical force is correlative to an amount of precursor material present on the at least one tray.

2. The precursor delivery system of claim 1, wherein the at least one tray is attached to the support member.

3. The precursor delivery system of claim 1, wherein the support member comprises a tube member and a base plate, wherein a proximal end of the tube member is coupled to the load cell and a distal end of the tube member is coupled to the base plate.

4. The precursor delivery system of claim 3, wherein the at least one tray is disposed on the base plate.

5. The precursor delivery system of claim 1, wherein the support member comprises a tube member defining a passageway for a carrier gas.

6. The precursor delivery system of claim 5, wherein the tube member is coupled to the at least one tray.

7. The precursor delivery system of claim 1, wherein the at least one tray is movable with respect to the ampoule.

8. The precursor delivery system of claim 1, wherein the at least one tray is not movable with respect to the support member.

9. The precursor delivery system of claim 1, wherein the load cell is mounted above the at least one tray to an interior surface of the ampoule.

10. The precursor delivery system of claim 1, wherein the load cell is disposed above the at least one tray on an exterior surface of the ampoule.

11. The precursor delivery system of claim 1, wherein the load cell is disposed in a recessed cavity formed in an exterior surface of the ampoule.

* * * * *